Figure 1:
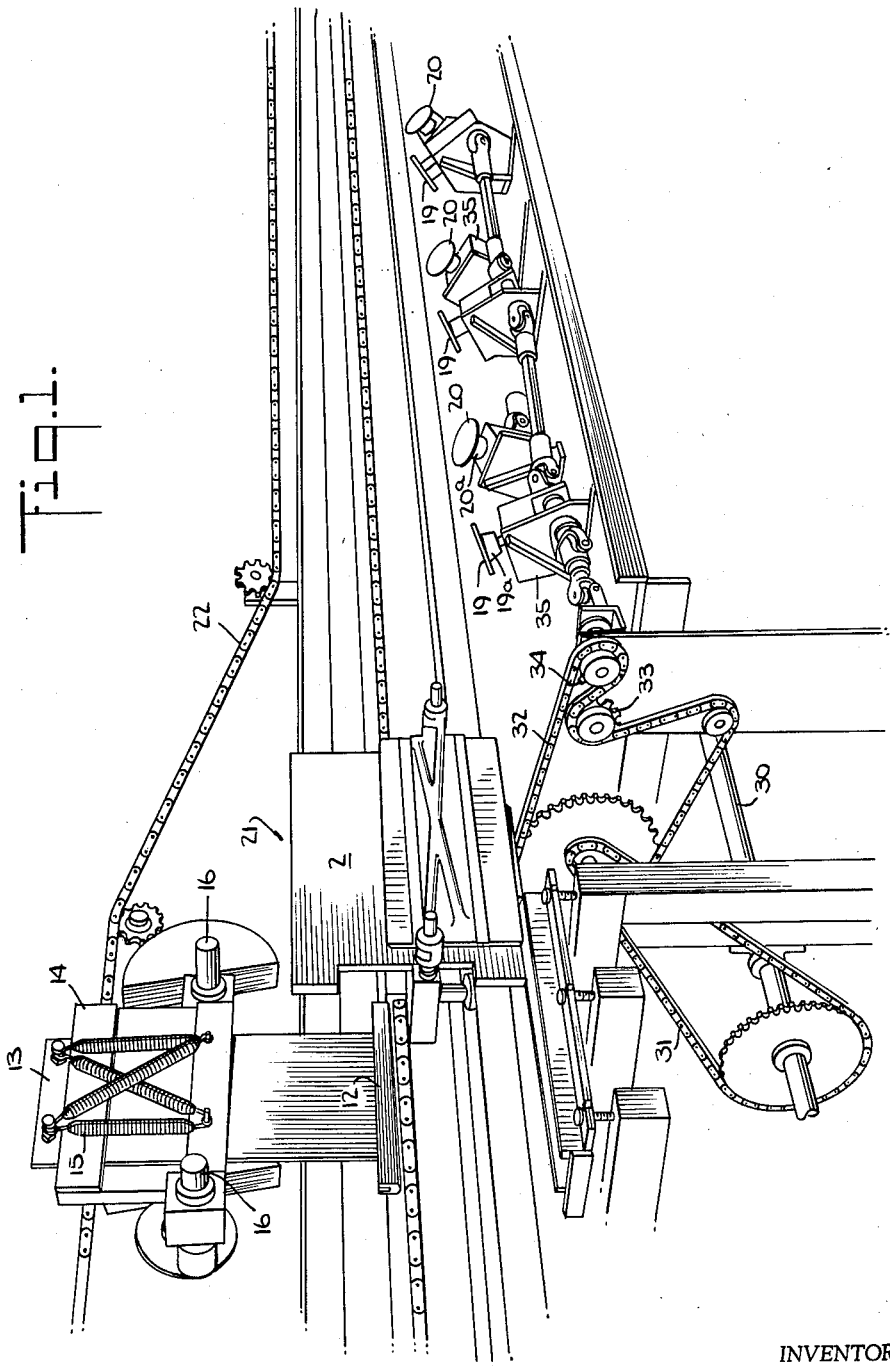

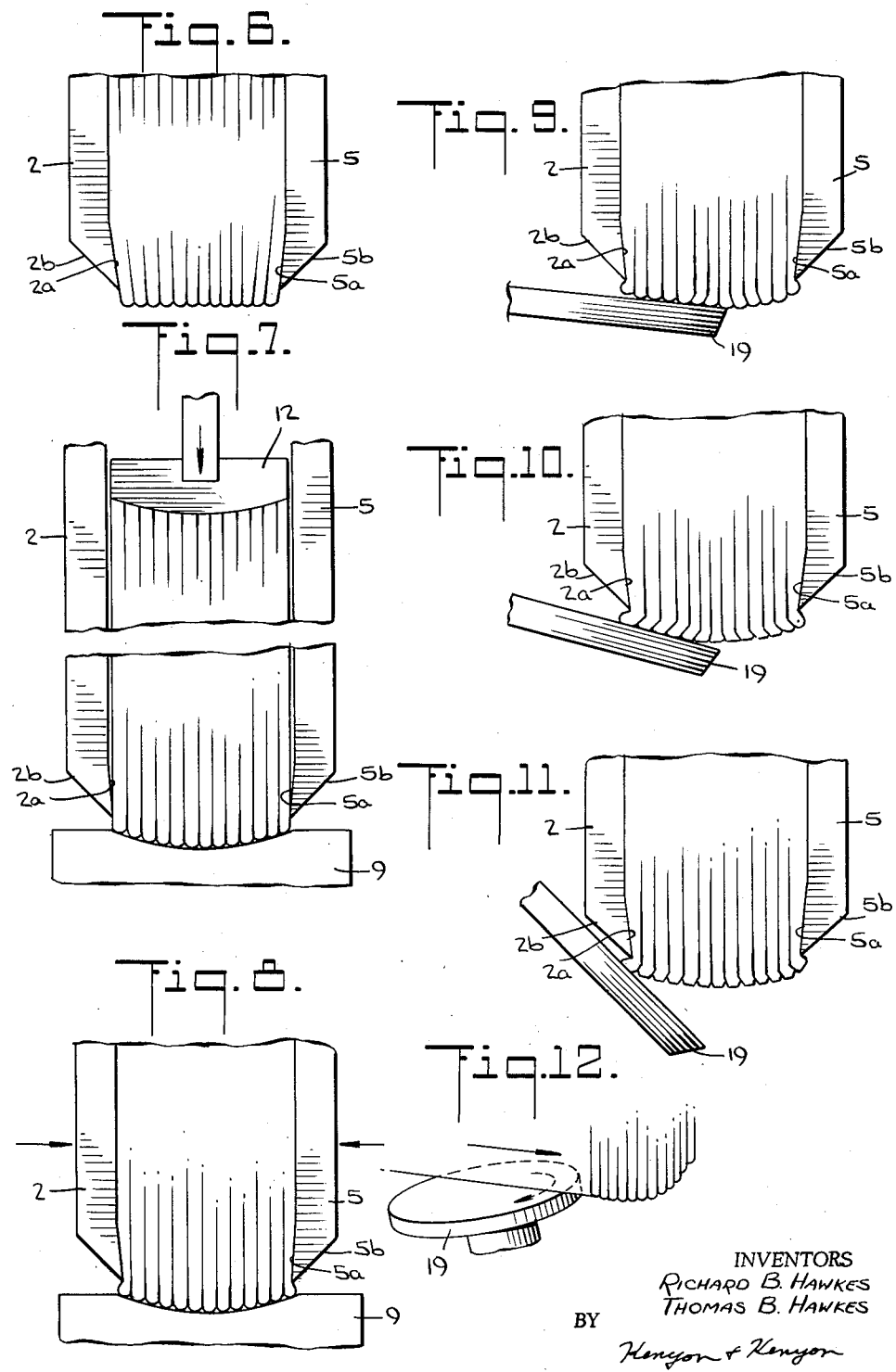

United States Patent Office 3,132,360
Patented May 12, 1964

3,132,360
BOOK BACK ROUNDING AND BACKING
Richard B. Hawkes, Easton, Pa., and Thomas B. Hawkes, Manhasset, N.Y., assignors to T. W. & C. B. Sheridan Co., New York, N.Y., a corporation of New York
Filed Aug. 8, 1962, Ser. No. 215,639
3 Claims. (Cl. 11—5)

This invention relates to continuous book rounding and backing.

Commercially books are rounded and backed on intermittently operating machines. An example is the machine disclosed by the Bredenberg Patent 2,010,810 dated August 13, 1935.

Prior art patents in some instances disclose rounding and backing machines intended to operate continuously. However, such machines have not been commercially successful.

The object of the present invention is to provide a continuous book rounding and backing machine capable of commercial production and use.

Briefly stated, a machine embodying this invention includes a travelling series of book clamps adapted to releaseably clamp books with their backs and fronts exposed. For convenience the books are carried end to end with their backs downwardly. These clamps carry the books past book rounding and backing stations which are both capable of operating on the continuously travelling books.

The book rounding station includes a book rounding assembly that is reciprocative in the clamps' travelling direction so as to travel with each clamp and return, and the machine has means for partly releasing or loosening each clamp as it and this assembly travel together, each clamp reclamping the book tightly after rounding. To permit the continuous book travel this assembly has a book back rounding die that is reciprocative with each travelling book through a path slightly below the book's back prior to the release or loosening of the clamp. A book front shaping punch is mounted to reciprocate towards and from the fronts of books in the clamps and being part of the assembly it is reciprocative in the travelling direction of the books. Means are provided for causing this punch to move into contact with and press against the front of each book as the assembly travels with the clamp holding this book and while the clamp is partly released or loosened, whereby to mold the signatures to round their fronts and to a substantial degree their backs also, the signatures slipping relative to each other during this action.

The above assembly need not have its two main components mechanically interconnecting providing they reciprocate together to move forwardly with the book and after each rounding operation return rapidly to meet the next oncoming book.

Book backing under commercial conditions has been done very successfully by machines of the type shown by the previously mentioned Bredenberg patent. Such machines apply a satisfactory right angular swaging force to the book backs but by using heavy equipment that cannot be made to reciprocate to work on continuously traveling books in a manner permitting higher production rates. However, the right angular swaging action provides very reliable backing.

Keeping the above in mind the book backing station of the present invention, which follows the rounding station, includes a plurality of disks having flat faces and having rotating mounting means extending from their backs at obtuse angles with respect to the clamps' travelling direction, at locations causing contact between the books backs and segments of the disks' faces that are located behind the disks' centers relative to the clamps' travelling direction. When the books travel with their backs downwardly these disks are located below the traveling clamps. These disks have their mounting means positioned to cause the just described segments to contact the books' backs on each side of the latters' center lines, using a plurality of the disks on each side, substantially tangent to progressive transverse segments of the backs.

In other words the disks are canted so as to incline with respect to the travelling book backs in directions in line with the books' travel path and so as to incline transversely or right angularly with respect to this path so that on each side of the center line the first disk engages each book back adjacent to its center line, the next disk engages the next outward segment and so on as required to obtain complete backing with the book travelling from one disk to another. The disks are provided with means for rotating them as the clamped books travel past them so that the described disk segments move substantially at right angles to the clamps' travelling direction outwardly with respect to the book backs' center lines.

With the clamped books travelling at high speed and the disks rotating adequately rapidly each book back throughout its length receives an outwardly directed swaging action by means of forces directed substantially right angularly with respect to the backs. With disks of reasonably large diameters a close approach to right angular swaging is effected. The books travel continuously during this operation. Burning or other damage to the backs of the signatures are avoided to a satisfactory degree.

Figure 2:
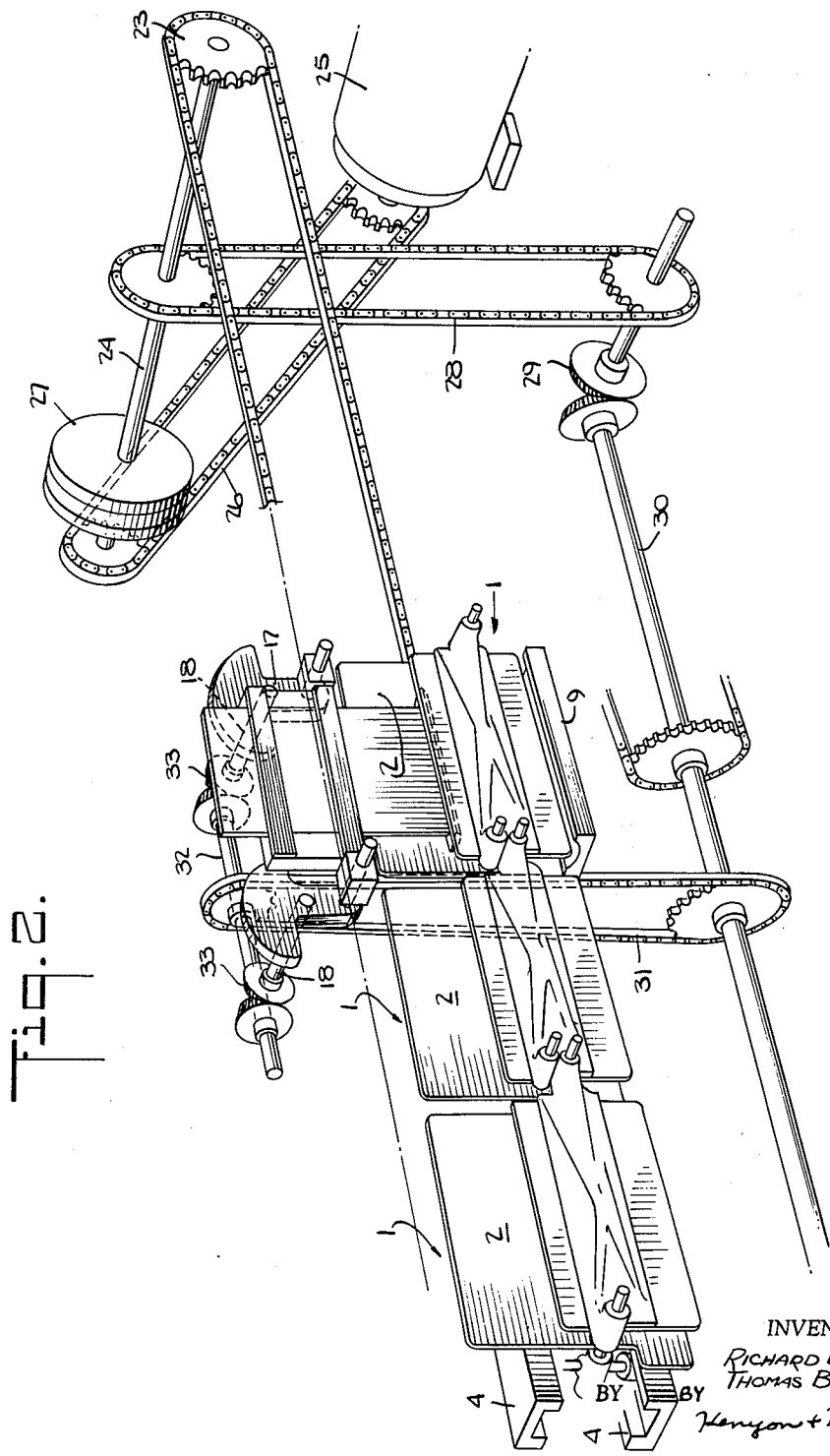
Figure 3:
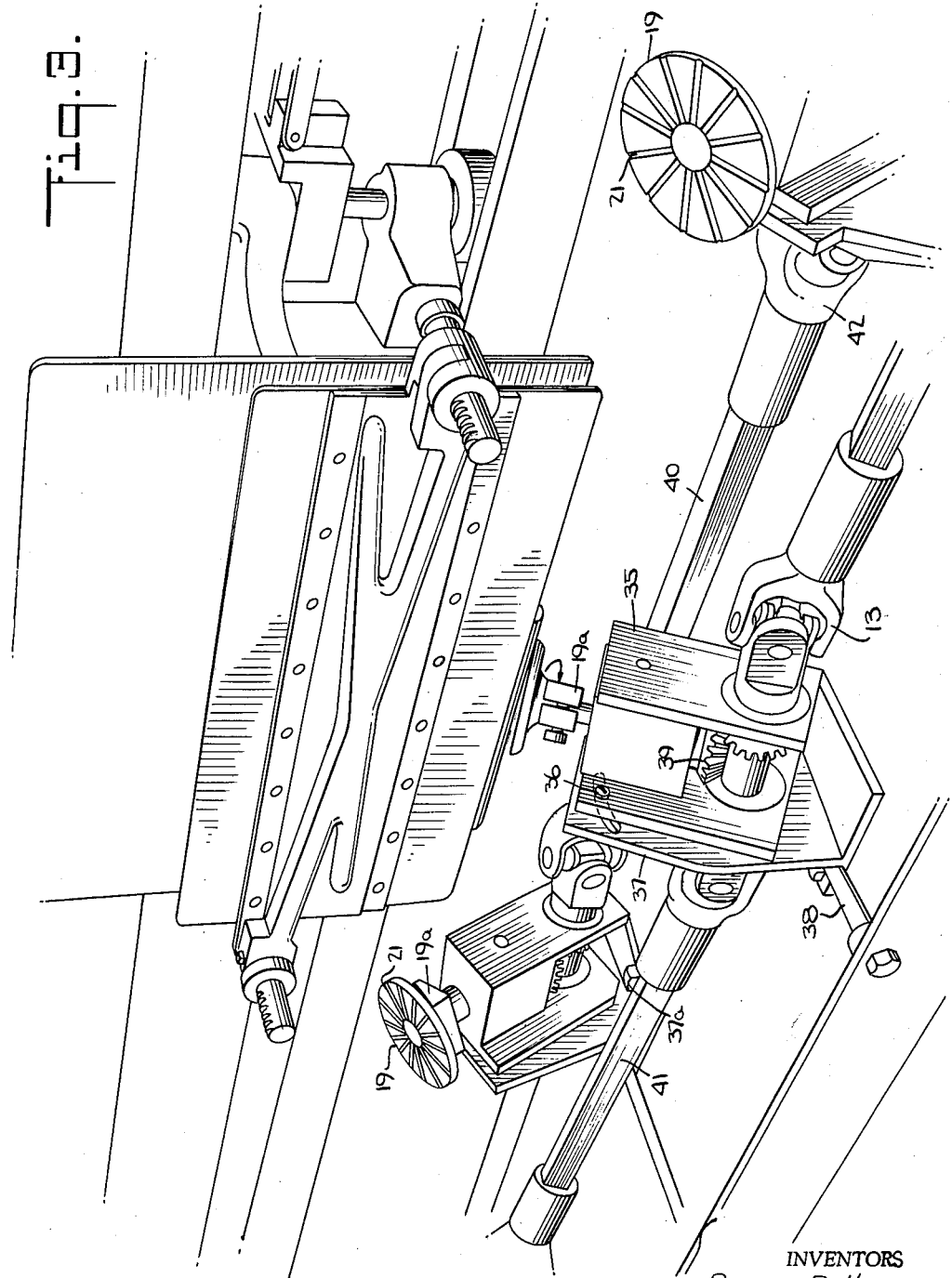
Figure 4:
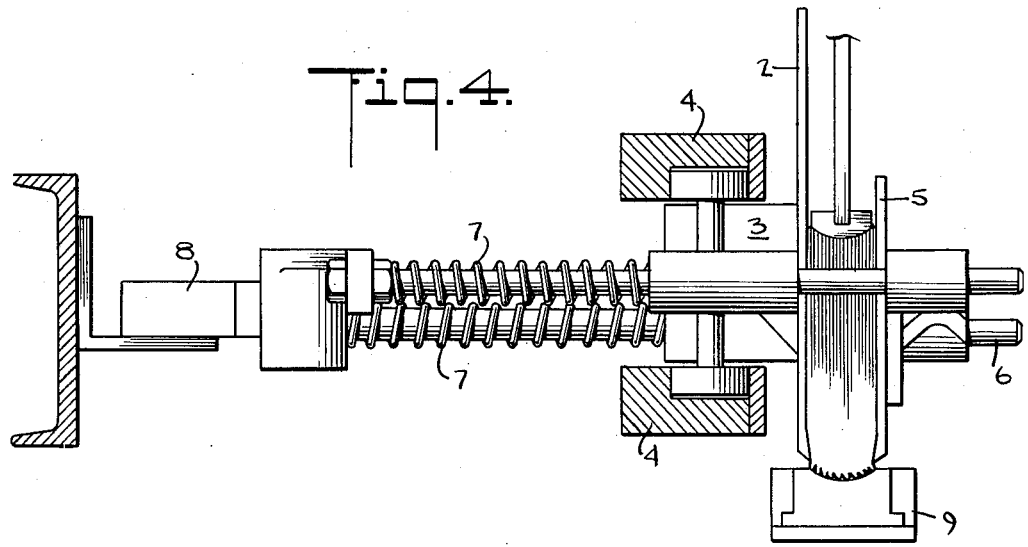
Figure 5:
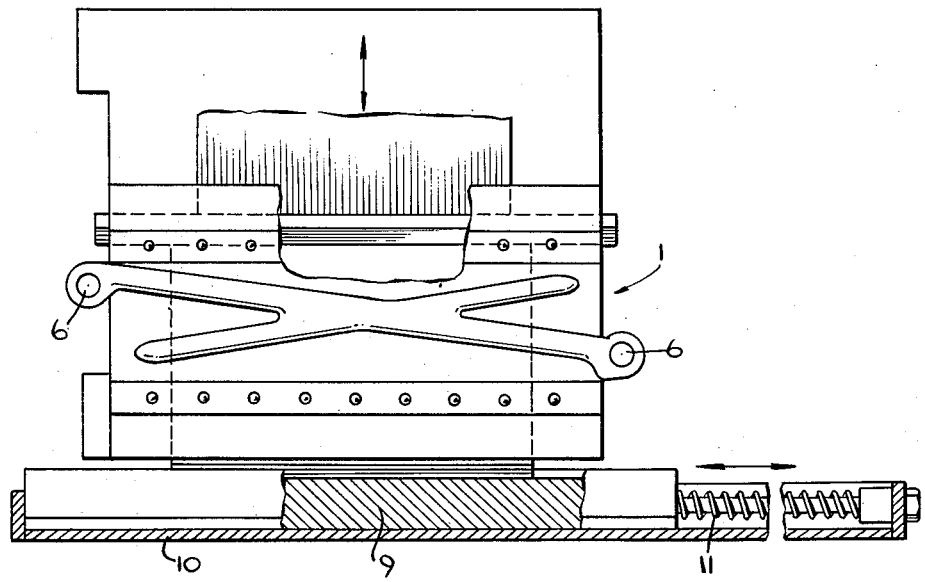

A successfully operated prototype of a machine incorporating the principles of the present invention is illustrated by the accompanying drawings in which:

FIG. 1 is a perspective view showing the two stations;
FIG. 2 is a perspective view showing the book clamps and driving details;
FIG. 3 is an enlarged scale perspective view showing a book clamp passing the backing station;
FIG. 4 is a cross section showing the book rounding assembly;
FIG. 5 is a side view of FIG. 4;
FIGS. 6–8 are end views respectively showing progressive steps in the book rounding;
FIGS. 9–11 correspond to FIGS. 6–8 but show the backing operation; and
FIG. 12 is a perspective view showing the manner in which the right angular backing force is effected.

In this prototype machine the book clamps 1 are provided as a short series which make a single pass past the rounding and backing stations. Thereafter the series must be returned for another pass. In a commercial machine a much larger number of book clamps would be used and they would be arranged to travel as an endless series in the usual manner excepting that the clamps would travel continuously instead of intermittently. However, as to each clamp the action would be the same as is provided by this prototype machine.

Each clamp 1 comprises an inner clamp plate 2 mounted by a carriage 3 which rides in a guideway 4. The books are clamped between this inner plate 2 and an outer plate 5 mounted on traversely reciprocative rods 6 which are constantly biased inwardly by compression coil springs 7. The innermost ends of the rods 6 are pushed outwardly by a stationary cam 8 contoured and located to provide the partial release or loosening of the clamp during the rounding and reclamping fully promptly thereafter.

The rounding assembly includes the book back rounding die or form 9 which is mounted in a guideway 10 for reciprocation in line with the continuously travelling books. A spring 11 constantly biases the die or form 9 backwardly with respect tot he books' travelling direction. The face of this die is transversely concave and longitudinally straight. It has the shape desired for the books' backs. The location of this reciprocative unit marks the rounding station.

Above the die 9 is located the punch or former 12. This has a face that is transversely convex and longitudinally straight. It has the shape desired for the books' fronts. This punch 12 is mounted by an upwardly extending plate 13 which reciprocates vertically in a mounting 14, being constantly biased downwardly by heavy tension coil springs 15. The mounting 14 itself has a revolving motion by being journaled on the crank pins 16 of the two cranks 17 having crank shafts 18 journaled by stationary bearings (not shown).

By proper timing a book clamped between the clamp plates 2 and 5 of any one of the clamps, with its back and front exposed, arrives over the backwardly biased die or form 9 while the cranks 17 are revolving towards the top of the book and while the cam or opener 8 has just partially released or loosened the clamp plate 5. As the crank 17 continues to turn towards the book, with the book clamp carrying this book continuously travelling, the punch or former 12 enters between the plates 2 and 5 and presses on the front of the book so as to curve the latter transversely while simultaneously pushing the book downwardly so that its back engages the die or former 9. The rounding operation then occurs.

The springs 15 strain elastically as the punch or former has its travel arrested by the book and as required to accommodate the revolving motion, the combination causing the die or former to travel lineally with the book. During this operation the die or form 9 is frictionally dragged by the book back so that everything reciprocates together. As the cranks 17 start to swing upwardly they reach a location where the punch or former 12 leaves the front of the book, the back of the book sliding from the die or form 9 and the latter's spring 11 rapidly returning this die or form backwardly to bring it below the next oncoming book. The crank 17 continuously rotates and another cycle is then repeated with the next book. The die or form 9 is longer than the books to assure it being effective at all times.

The above reciprocative assembly operates satisfactorily. If desired the die or form 9 can be mechanically connected with the upper mechanism for positive reciprocation regardless of the presence of a book.

Rounding operations are shown by FIGS. 6–7. As shown by FIG. 6 the book starts out, after its customary loading in the clamp, with its back slightly below the lower edges of the clamping plates 2 and 5. The action of the punch or former 12 is shown by FIG. 7 together with the loosening or partial release of the clamping plate 5 from the plate 2. The book is pushed downwardly to bring its back into contact with the die or form 9. Finally, FIG. 8 shows how the book is completely pressed downwardly with pressure against the die or form 9 so as to more or less round the book's back, the book's front of course being fully rounded as indicated in FIG. 7. While the book's back is pressed against the die 9 tightly the latter is frictionally carried along with the constantly travelling book, the die or punch 12 of course also travelling with the book as previously described.

As each clamp 1 continues to travel without interruption beyond the rounding station just described, and before the die or punch 12 releases its pressure on the front of the book, the action of the cam 8 causes the springs 7 to return full clamping pressure by drawing the plate 5 forceably towards the plate 2.

After the rounding operation each book has a fixed location relative to the clamping plates. This location is such as to bring the book's back slightly below the lower edges of the plates 2 and 5, these lower edges being parallel and in the same horizontal plane with respect to each other. The lower edges of the plates on their inner sides incline slightly towards each other as shown at 2a and 5a so that the lowermost extremities of the plates grip the book most tightly along the two lines thus established. These inclined portions, or jaws, may be provided by inserts fixed to the clamp plates (not shown) or by contouring the plates themselves. These two lines are located relative to the book so as to locate the book's hinge lines. Preferably the bottom edges of the two plates are chamfered as at 2b and 5b. The clamps grip tightly enough to by their jaw portions slightly indent the outermost signatures as shown by FIG. 8.

The book backing assembly is stationarily positioned. Reference to FIGS. 1 and 3 shows that the series of disks 19 is located to engage each book back on one side of its center line, and the corresponding series of disks 20 is located to engage the back on the other side of its center line. In this prototype the disks have flat faces, are about 4" in diameter, they are turned at approximately 1,000 r.p.m. per 2,000 inch per minute book traveling speed, and their surfaces are radially slotted as at 21. These factors are exemplary and not critical excepting that the disk diameters should be reasonably large and the disks rotation reasonably fast. FIG. 1 shows three discs on each side of the book back's center line. The first disc encountered by the book back has only a relatively slight transverse angularity with respect to the horizontal. The second disk has a somewhat greater angularity and the third has an angularity of approximately 45°. The first disk is adjusted to provide a relatively slight pressure against the book to lightly start the backing, the next disk is adjusted to provide heavier pressure to carry this start on further, and, finally, the third disk is adjusted with enough pressure to complete the backing operation and form the book joint. During this operation the inwardly projecting edges or jaws of the clamp plates keep the signatures anchored firmly against possibly working upwardly, and they also pinch the sides of the book so that the joint is more permanent than might otherwise be obtained.

It is to be understood that although three disks per side operate successfully, more disks may be desirable in some instances. Variations in the rotative speeds of the disks relative to the book travelling speed are possible.

The disks have rotary mounting means 19a and 20a, respectively, for the disks 19 and 20 extending from their backs at obtuse angles with respect to the books' travelling direction. This causes the disks to have their inclined positions in a vertical plane parallel to the plane of the books held by the clamps. This causes only the rear segments of the disks beyond the latters' centers to contact the books' backs. Since each such segment is embraced by a relatively small angle, the flaring force applied to the book's back is substantially at right angles to the travel of the book. Insofar as is possible FIG. 12 illustrates this effect. The disks are rotated in directions causing these rear segments that contact the books to move outwardly with respect to the backs center lines. The action is substantially all at right angles to the book's back.

The angularities of the disks in planes transverse to the plane of the books varies from the slight angularity previously mentioned, progressively to the maximum angularity required to back the book completely. This angularity is of course also effected by adjustment of the axis of the mounting means 19a and 20a.

In the foregoing manner the disks are positioned and located by their mounting means to cause the segments of the disks' faces located behind the disks' centers relative to the clamps' travelling direction, to contact the books' backs on each side of the backs' center lines with a plurality of the disks on each side in each instance. The contact between the disks' flat faces and the rounded backs is substantially tangent with respect to the latter. In other words the disks' faces are tangent to progressive transverse segments of the rounded backs outwardly with respect to the backs' center lines.

There must be enough friction between the disks' faces and the books' backs to flare the signatures as required by the backing. The pressure between the disks and each back should be such as to assist in the backing by pushing upwardly against the back while the friction drive flares the backs until proper joints are formed. The grooves 21 may cause the disks to collect glue from the backs, in some instances. If so, the number of disks may be increased and their faces finished plain or ungrooved and with a high polish. The disks may have hardened steel faces, or the latter may be plated with a chromium, for example, and polished to a mirror finish.

This backing operation is effected without any interruption in the continuous travel of the books held between the clamps. The single pass provided by the prototype machine is made without any interruption throughout the rounding and backing operation. The operation would go on forever if the usual endless series of clamps were used and driven continuously as will be the case when the principles of the invention are incorporated in a commercial machine.

Understandably, the rounding operation is sometimes referred to as a pre-rounding. This operation shown by FIGS. 6–8 is mainly to provide the concave front of the book and to start the rounding of the back of the book. Books prior to rounding and backing ordinarily comprise a block of collated signatures sewed and/or glued together at or adjacent to their backs. The rounding or pre-rounding flares the signature backs slightly and they try to stay tangent to the outside contour or round shape thus imparted. The backing operation shown by FIGS. 9–11 bends the signature backs more sharply outwardly while folding them on one another and bending the outermost signatures particularly sharply at the jaws of the clamp to crease them and establish a good joint for the further binding operations.

In the interest of exposing the details of this invention more plainly the necessary frame work and base required by a machine of this character have not been illustrated. It is to be taken for granted that all of the parts are suitably mounted including the necessary journals and the like for the various shafts now described below for the purpose of illustrating the driving and timing of the various elements.

Referring now particularly to FIGS. 1 and 2, the clamps 1 are located closely together and are carried along by a sprocket chain 22 which is suitably guided and is looped over a driving sprocket wheel 23 keyed to a shaft 24 driven by a suitable motor 25 through a sprocket chain and wheel drive 26. The shaft 24 may be considered to be the main drive shaft and it is provided with a clutch and brake assembly 27 of conventional type. This permits the motor 25 to be running at full speed with the clutch 24 disengaged and the series of book clamps at their starting positions. Then the clutch is engaged quickly so that the clamps practically immediately obtain a full speed equivalent to that they would have in a commercial machine using an endless clamp series. Immediately after the backing operation the shaft 24 is de-clutched and the brake of the assembly 27 is applied to bring the clamp series to an immediate stop.

A sprocket chain and wheel drive 28 carries rotary power from the shaft 24 through right angle gearing 29 to a shaft 30 that extends longitudinally with respect to the machine. From this shaft 30 through a sprocket chain and wheel drive 31 the rotary power is carried upwardly to a shaft 32 which through right angle gearing 33 drives the two crank shafts 18. The timing is such as to cause the crank 17 to descend towards each book clamp as the latter arrives over the die or former 9, the latter reciprocating along with each book and snapping backwardly to meet the next. When the next book clamp comes along the cranks 17 are starting their next revolution and are again swinging downwardly.

It is only necessary to keep the disks 19 and 20 rotating at their selected speeds, no timing being required in this case. This rotation is effected by a sprocket chain and wheel drive 31 which drives an intermediate sprocket chain and wheel drive 32, the chain of this intermediate drive including two sprocket wheels 33 and 34 over which the chain loops reversely to obtain the necessary opposite rotation required by the mutually opposite series of disks.

The mounting means 19a and 20a of the various disks in each instance are shafts journaled by mountings 35, each of these mountings being adjustable as to angularity in the two vertical planes respectively parallel to and at right angles to the books held between the clamps. This may be done in various ways. In the prototype machine, as shown by FIG. 3, the mountings 35 are clamped by releasable screw fastenings 36 to vertically extending brackets 37, each mounting 35 being pivotal so that it may be swung in a plane at right angles to the clamps and after adjustment rigidly held by means of the screw fastenings 36. In turn the brackets 37 are mounted to pivot about a vertical axis on a fastening 37a in each instance, and their angularities in the horizontal plane may be adjusted by means of screws 38. Thus the angularity of the disks may be varied in all planes or in a universal manner as required to achieve the exact angularity desired for the faces of the various disks. All of these mountings are the same and are given the same numerals as to both series of disks. It is to be understood that the disks must contact the books' backs at locations progressively located increasing distances outwardly from the backs' center line. This is shown clearly by FIGS. 9–11.

As shown, the mounting means 19a and 20a of the two disks series include shafts journaled by the various mountings and which are driven through right angle gearing 39 by a series of shafts 40 and 41 respectively for the two series. These shafts are articulated through universal couplings 42 and 43 including suitable spline connection where necessary and are keyed respectively to the sprocket wheels 33 and 34.

It follows from the foregoing that as the clamps pass the various disks are turned in the proper directions and at the proper speeds. These speeds may be varied by varying the gear ratio of the sprocket wheel and chain drive 32 or the other drive 31 depending on convenience.

Attention is called to the fact that the rotation of the disks cannot be related to the travelling directions of the books. Instead the rotation must be such as to cause the trailing segments of the disks which engage the backs of the books to move outwardly with respect to the center lines of these backs. The axis of the disks are obtuse with respect to the travel of the books. Because the disks rotate rapidly relative to the travelling speed of the books practically all of the frictional effect exerted against the backs is right angular.

What is claimed is:

1. A machine for backing books, including means for causing the books to travel with their backs in alignement, a plurality of disks having substantially flat faces and having rotary mounting means extending from their backs and positioned at obtuse angles longitudinally with respect to the books travelling directions at locations causing contact between the books backs and the segments of the disks' faces that are located behind the disks' centers relative to said direction, and means for rotating the disks in directions causing said segments to move susbtantially at right angles to said direction and outwardly with respect to said backs' center lines.

2. A machine for backing books having pre-rounded backs, including means for clamping each book along lines parallel to its back and located to define the books' hinge line, means for causing the clamped books to travel with their backs in alignment, a plurality of disks having substantially flat faces and having rotary mounting means extending from their backs at obtuse angles longitudinally with respect to the books' travelling direction at locations causing contact between the books' backs and the segments of the disks' faces that are located behind the disks' centers relative to said direction, said disks having their mounted means positioned to cause said segments to contact said backs on each side of the backs' center lines, as to a plurality of the disks in each instance, substantially tangent to progressive transverse segments of the rounded backs, and means for rotating said disks so that their said segments move substantially at right angles to the books' travelling direction outwardly with respect to the backs' center lines.

3. A continuous book rounding and backing machine including a continuously travelling series of book clamps adapted to releaseably clamp books with their backs in alignment and with their backs and fronts exposed, and book rounding and backing stations past which the books are carried by said clamps, the book rounding station including a book rounding assembly that is reciprocative in the clamps' travelling direction so as to travel with each clamp and return and the machine including means for partly releasing each clamp as it and this assembly move together and thereafter causing this clamp to reclamp fully, said assembly including a book back rounding die for the backs of books in this clamp, a book front shaping punch that is reciprocative towards and from the fronts of books in the clamps and means for causing this punch to move into contact with and press against each book as the assembly travels with the clamp holding this book, said book backing station following said rounding station and including a plurality of disks having flat faces and having rotary mounting means extending from their backs at obtuse angles with respect to the clamps' travelling direction at locations causing contact between the books' rounded backs and the segments of the disks' faces that are located behind the disks' center relative to the clamps' travelling direction, said disks having their mounting means positioned to cause said segments to contact said backs on each side of the backs' center lines, as to a pluarlity of the disks in each instance, substantially tangent to progressive transverse segments of the rounded backs, and means for rotating said disks as the clamps travel past them so that the said segments move substantially at right angles to the clamps' travelling direction outwardly with respect to the backs' center lines.

References Cited in the file of this patent
UNITED STATES PATENTS

| | | |
|---|---|---|
| 476,208 | Lovell et al. | May 31, 1892 |
| 1,804,362 | Alger | May 12, 1931 |
| 2,516,446 | Budden | July 25, 1950 |
| 2,585,433 | Burls | Feb. 12, 1952 |